United States Patent

Toyota et al.

[11] Patent Number: 5,325,739
[45] Date of Patent: Jul. 5, 1994

[54] TRANSMISSION FOR AUTOMOTIVE VEHICLE

[75] Inventors: Hideo Toyota, Hiroshima; Wataru Kuwahara, Hatsukaichi, both of Japan

[73] Assignee: Mazda Motor Corporation, Hiroshima, Japan

[21] Appl. No.: 976,929

[22] Filed: Nov. 18, 1992

[30] Foreign Application Priority Data

Nov. 19, 1991 [JP] Japan .................. 3-303427

[51] Int. Cl.⁵ ............................................. F16H 57/02
[52] U.S. Cl. ................................................. 74/606 R
[58] Field of Search ......................... 74/606 R, 606 A

[56] References Cited

U.S. PATENT DOCUMENTS

| | | | |
|---|---|---|---|
| 2,072,380 | 3/1937 | Pfeiffer et al. | 74/606 R |
| 2,105,742 | 1/1938 | Lee | 74/606 R |
| 2,308,852 | 1/1943 | Backus | 74/606 R |
| 4,324,152 | 4/1982 | Oshima et al. | 74/606 R |
| 4,467,754 | 8/1984 | Hayashi et al. | 74/606 R |
| 4,499,791 | 2/1985 | Brisabois | 74/606 R |
| 4,539,865 | 9/1985 | Yoneda et al. | 74/606 R |
| 4,784,009 | 11/1988 | Sakamoto et al. | 74/606 R X |
| 4,899,622 | 2/1990 | Kobayashi | 74/606 R X |

FOREIGN PATENT DOCUMENTS

| | | | |
|---|---|---|---|
| 54-65258 | 5/1979 | Japan | 74/606 R |
| 61-163021 | 7/1986 | Japan | 74/606 R |
| 62-188852 | 8/1987 | Japan | 74/606 R |
| 1-153845 | 6/1989 | Japan | 74/606 R |
| 2-134449 | 5/1990 | Japan | 74/606 R |

Primary Examiner—Vinh T. Luong
Attorney, Agent, or Firm—Keck, Mahin & Cate

[57] ABSTRACT

A transmission apparatus has a transmission casing which is divided into two parts, namely, a front part casing, shaped generally as a frustum of a cone for forming a front part of the transmission casing and a rear part casing shaped generally as a frustum of a cone, for forming a rear part of the transmission casing. The rear part casing and the front part casing are connected to each other so as to form the transmission casing which has a cross section which gradually decreases from the front to the back of the transmission casing.

10 Claims, 11 Drawing Sheets

TRANSMISSION FOR AUTOMOTIVE VEHICLE

BACKGROUND OF THE INVENTION

1. Field of the Invention

The present invention relates to a transmission casing for an automotive vehicle and, more particularly to a transmission casing which comprises a front casing and a rear casing.

2. Description of Related Art

Typically a transmission casing for containing a transmission mechanism therein comprises a front part casing and a rear part casing which are connected. As shown in FIG. 12, a transmission casing "a" for containing a transmission mechanism "b" and a clutch "c" therein is divided into two parts, namely, a front part casing "$a_1$" and a rear part casing "$a_2$." The transmission mechanism "b" includes an input shaft "d," a main shaft "e" and a counter shaft "f" on which a plurality of gears and a synchro-mesh mechanism are mounted so as to provide a plurality of gear ratios. The transmission mechanism further includes a control rod "g" for actuating the synchro-mesh mechanism as well as a shift mechanism. The shaft mechanism cooperates with a detent mechanism and a mis-shift prevention mechanism. A large portion of these elements is arranged within the transmission casing "a." The clutch "c" has a relatively large diameter and is placed within a front portion of the front part casing "$a_1$." In order to receive compactly the clutch "c", which has a large diameter, the front part casing "$a_1$" as a front portion, shaped as a frustum of a, steeply inclining cone steeply inclining, and a cylindrically shaped rear portion.

If such a transmission casing has low structural stiffness, the transmission casing tends to generate noise due to vibration transmitted thereto. Consequently, the transmission casing must have a high structural stiffness. From the standpoint of structural stiffness, the transmission casing "a," which has a cylindrical shape from a middle portion to the rear part casing, is not always advantageous. Because the transmission includes a number of mechanical elements therein, the transmission casing is generally bulky and, accordingly, must be improved so as to be compact in size or geometry.

SUMMARY OF THE INVENTION

It is an object of the present invention to provide a transmission apparatus having a transmission casing shaped so as to have a high structural stiffness which reduces noise due to vibration.

It is another object of the present invention to provide a transmission having a transmission casing which allows various elements of the transmission apparatus to be arranged compactly and which has a small overall size.

The above objects are achieved by providing a transmission apparatus having a transmission casing and transmission means housed in the transmission casing. The transmission casing comprises a front part casing, shaped generally as a frustum of a cone for forming a front part of the transmission casing, and a fear part casing, shaped generally as a frustum of a cone, for forming a rear part of the transmission casing. The rear part casing and the front part casing are connected to each other so as to form the transmission casing, which has a cross section gradually decreasing from the front to the back of the transmission casing. Specifically, the transmission casing is formed with a generally cylindrical transitional portion, formed by a rear end portion of the front part casing and a, front end portion of the rear part casing, for containing various elements including a control rod of a gear shift mechanism, therein.

The front part casing forms therein a clutch housing for housing a clutch means including a large diameter of clutch elements. A transmission housing partly a extends in the clutch housing for housing a part of a transmission means. Between the clutch housing and a part of the transmission housing extending in the clutch housing there is provided a rib, extending radially so as to connect the clutch housing and a part of the transmission housing. The clutch housing preferably extends to the middle portion of the transmission casing.

The transmission apparatus is formed with an oil path, formed in an inclined wall of the rear part casing, for supplying lubrication oil to a slidable yoke, disposed in a rear end portion of the rear part casing, for connecting the transmission to a propeller shaft. The transmission apparatus further includes holding means for holding a gear change lever and a bracket for connecting the holding means to the transmission casing. The bracket is secured to the transmission casing by bolts which secure the rear part casing to the front part casing.

The transmission casing, which is divided into two parts, is shaped generally as a frustum of cone and provided with a cylindrical transitional portion between the front and rear part casings. Such enables easy assembly of the transmission apparatus, provides an overall structure with high structural stiffness so that it suffers less vibration from an engine, and allows elements of gear shift means in the cylindrical portion to be compact.

BRIEF DESCRIPTION OF THE DRAWINGS

The above and other objects, and features and advantages of the present invention, will be understood from the following detailed description of a preferred embodiment thereof when considered in connection with the accompanying drawings, in which.

DETAILED DESCRIPTION OF THE PREFERRED EMBODIMENT

Because transmission apparatuses are well known, the present description will be directed in particular to elements forming part of, or cooperating with, the novel construction in accordance with the present invention. It is to be understood that elements not specifically shown or described can take various forms well known to those skilled in the art.

It should be noted that the words "front" and "rear" in this specification indicate directions toward the input side and output side of a transmission, respectively.

Figure 1:
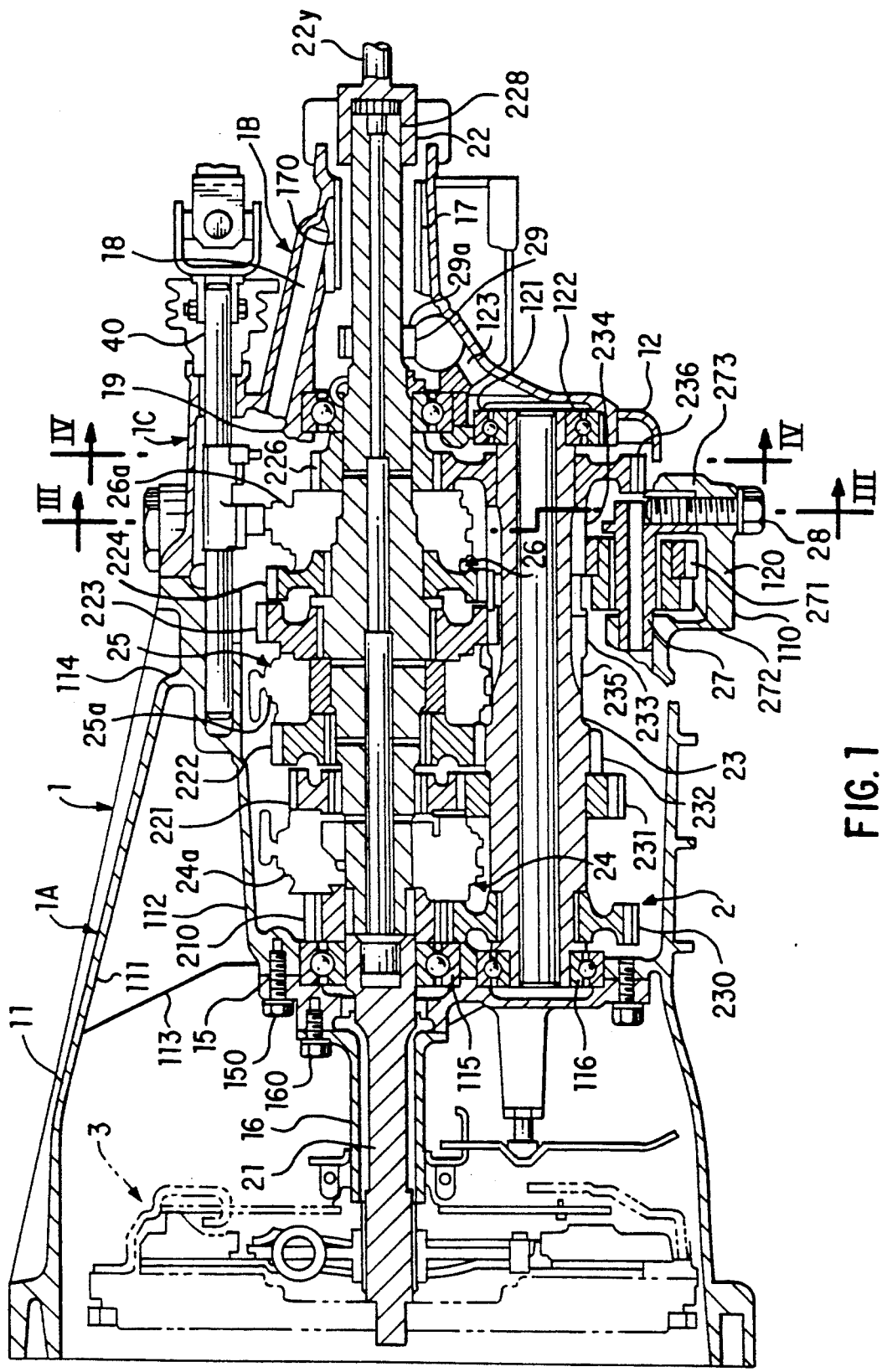
FIG. 1 is a cross-sectional view of a transmission apparatus in accordance with a preferred embodiment of the present invention.
Figure 2:
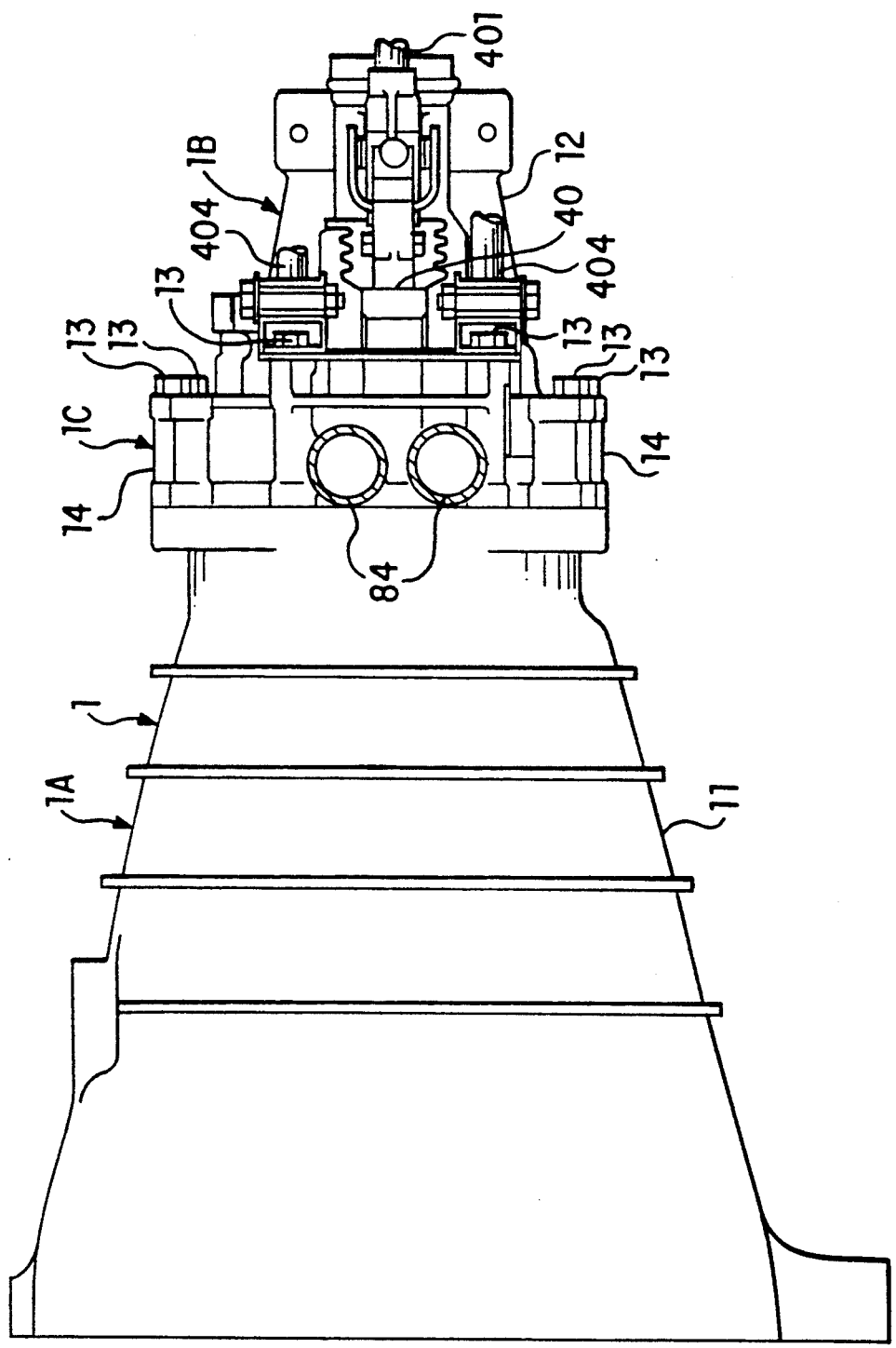
FIG. 2 is a plan view, partly in section, of the transmission apparatus of FIG. 1.

Referring to the drawings in detail, and in particular, to FIGS. 1 and 2, a transmission installed in a transmission casing 1 in accordance with a preferred embodiment of the present invention is shown the transmission casing has a front part casing 11 and a rear part casing 12. The transmission, which includes a transmission mechanism 2 and a clutch mechanism 3, has a transmission input shaft 21, a main shaft 22 and a counter shaft 23. The transmission is operationally coupled to an engine output shaft (not shown), such as a crankshaft, through the clutch mechanism 3. On the other hand, the main shaft 22 is operationally coupled to a propeller shaft or drive shaft (not shown) through a sliding yoke (not shown). The main shaft is disposed coaxially with the input shaft 21, and a counter shaft 23 is disposed in parallel with the main shaft 22. All of the shafts 21 to 23 are held for rotation by the transmission casing 1 through bearings.

The input shaft 21 is provided at its rear end with a drive gear 210. On the other hand, the counter shaft 23 is provided with various counter gears, such as a drive gear 230, a third speed gear 231, a second speed gear 232, a first speed gear 233, a reverse gear 234, and an over-drive gear 236 in this order from the clutch side. Through a direct engagement between the drive gears 210 and 230, the input gear 21 and the counter shaft 23 are operationally coupled to each other. As shown in FIG. 1, gear teeth 235 from the first speed gear 233 and the reverse gear 234. That is, the counter shaft 23 is integrally formed with the teeth 235. Front parts of the teeth 235 are assigned as the first speed gear 233, and rear parts of the teeth 235 are assigned as the reverse gear 234.

The main shaft 22 is provided with various counter gears, such as a third speed-fourth speed (3-4) synchronizing mechanism 24, a third speed gear 221, a second speed gear 222, a first speed-second speed (1-2) synchronizing mechanism 25, a first speed gear 223, a reverse gear 224, an over-drive-reverse (O-R) synchronizing mechanism 25 and an over-drive gear 226, in this order from the clutch side. All of the speed gears 221 to 224 and 226 are mounted for rotation on the main shaft 22. The synchronizing mechanisms 24–26 have annular slidable sleeves 24a, 25a and 26a, respectively, which are slid in the axial direction by shift rods 41, 42 and 43 (which will be described later), respectively. The respective annular slidable sleeve brings a front gear of the synchronizing mechanism into engagement with the main shaft 22 when the annular slidable sleeve slides forward, and a rear gear of the synchronizing mechanism into engagement with the main shaft 22 when the annular slidable sleeve slides rearward. Otherwise, when the annular slidable sleeve is in a neutral position, the synchronizing mechanism is free from the main shaft 22. The third gear 221, the second speed gear 222, the first speed gear 223 and the over-drive gear 226 of the main shaft 22 are in mesh with corresponding counter gears of the counter shaft 23, namely, the third speed gear 231, the second speed gear 232, the first speed gear 233 and the over-drive gear 233. The reverse gear 224 of the main shaft 22 is operationally coupled to the reverse gear 234 of the counter shaft 23 through an idle gear of an idle shaft 27. In order to provide a high reduction ratio of the reverse gear, the idle shaft 27 is provided with first and second idle gears 271 and 272, operationally united to each other, which are in mesh with the counter reverse gear 234 and the reverse gear 224, respectively. The idle shaft 27 is integrally formed at its rear end with a radially extending fitting 273 which is secured to the rear part casing 12 with a bolt 28. The main shaft 22 is formed, at its rear end, with a spline 228. Through the spline 228, a gear 29, through which the main shaft 22 is coupled to a speed meter (not shown) is attached to the main shaft 22. Further, through the spline 228, the yoke is fitted to the main shaft 22. In order to allow the speed meter gear 29 to be easily attached to the main shaft 22, the spline 228 has a certain length from the rear end of the main shaft 22. The speed meter gear 29 is fixed to the main shaft 22 by means of a washer 29a so as to be prevented from slipping out from the main shaft 22.

The front part casing 11 is formed with a rear flange 110, and the rear part casing 12 is formed with a front flange 120. The front and rear part casings 11 and 12 are secured through the flanges 110 and 120 by a plurality of bolts 13. The transmission casing 1 has a front portion 1A, generally shaped as a frustum of a cone and forming a front part of the front part casing 11, which is formed sufficiently large to contain the clutch mechanism 3 therein. The transmission casing 1 also has a cylindrical transitional portion 1C forming a rear part of the front part casing 11, and a rear portion 1B shaped as a frustum of a cone, slightly inclining and forming the whole part of the rear part casing 12. The cylindrical transitional portion 1C of the front part casing 11 is integrally formed with a plurality of bosses 14 for bolts by which the transmission casing 1 is secured to a vehicle body. The front part casing 11 comprises a conical clutch housing 111 and a transmission housing 112. The transmission housing 112 partly extends toward the clutch mechanism 3 within the clutch housing 111. In a wedge-like space formed in an upper portion of the clutch housing 111, there is a reinforcing rib 113 extending between and connecting the clutch housing 111 and the transmission housing 112. The transitional portion 114, between the front portion 1A and the cylindrical transitional portion 1C of the front part casing 11, is placed at approximately the middle of the transmission casing in the axial direction.

In the front end portion of the transmission housing 112, there is disposed a thrust bearing 115 through which the input shaft 21 is supported for rotation by the transmission housing 112. There is further disposed a thrust bearing 116 through which the counter shaft 23 is supported for rotation by the transmission housing 112. The transmission housing 112 is formed with an annular collar 16 to which a front cover 15 is secured by bolts 150 and 160 so as to close the front end of the transmission housing 12. In the rear end portion of the transmission housing 112, there are disposed thrust bearings 121 and 122 through which the main shaft 22 and the counter shaft 23 are, respectively, supported for rotation by the transmission housing 112. The transmission housing 112 is formed with an annual collar 16 to which a front cover 15 is secured by bolts 150 and 160 so as to close the front end of the transmission housing 12. A bearing cover 19 is secured to the transmission housing 112 by means of bolts 190 (see FIG. 4) passing through the rear part casing 12. A bush 17 is fitted in the rear end of the rear part casing 12 so as to support the slidable yoke for rotation.

The rear part casing 12 has an oil path 18 formed in the wall. The oil path 18 opens near the over-drive gear 226 of the main shaft 22 at its one end and reaches the bush 17 at its other end. Through the oil path 18, oil puddled on the bottom of the rear part casing 12 is scooped up by means of oil gears 236 and 226 and supplied into the oil path 18. The oil is then supplied between the bush 17 and the slidable yoke through an oil hole 170 formed in the wall of the bush 17. The oil is further supplied to the thrust bearing 122 through an oil path 123 formed in the wall of the rear part casing 12 after having lubricated the bush 17.

Figure 3:
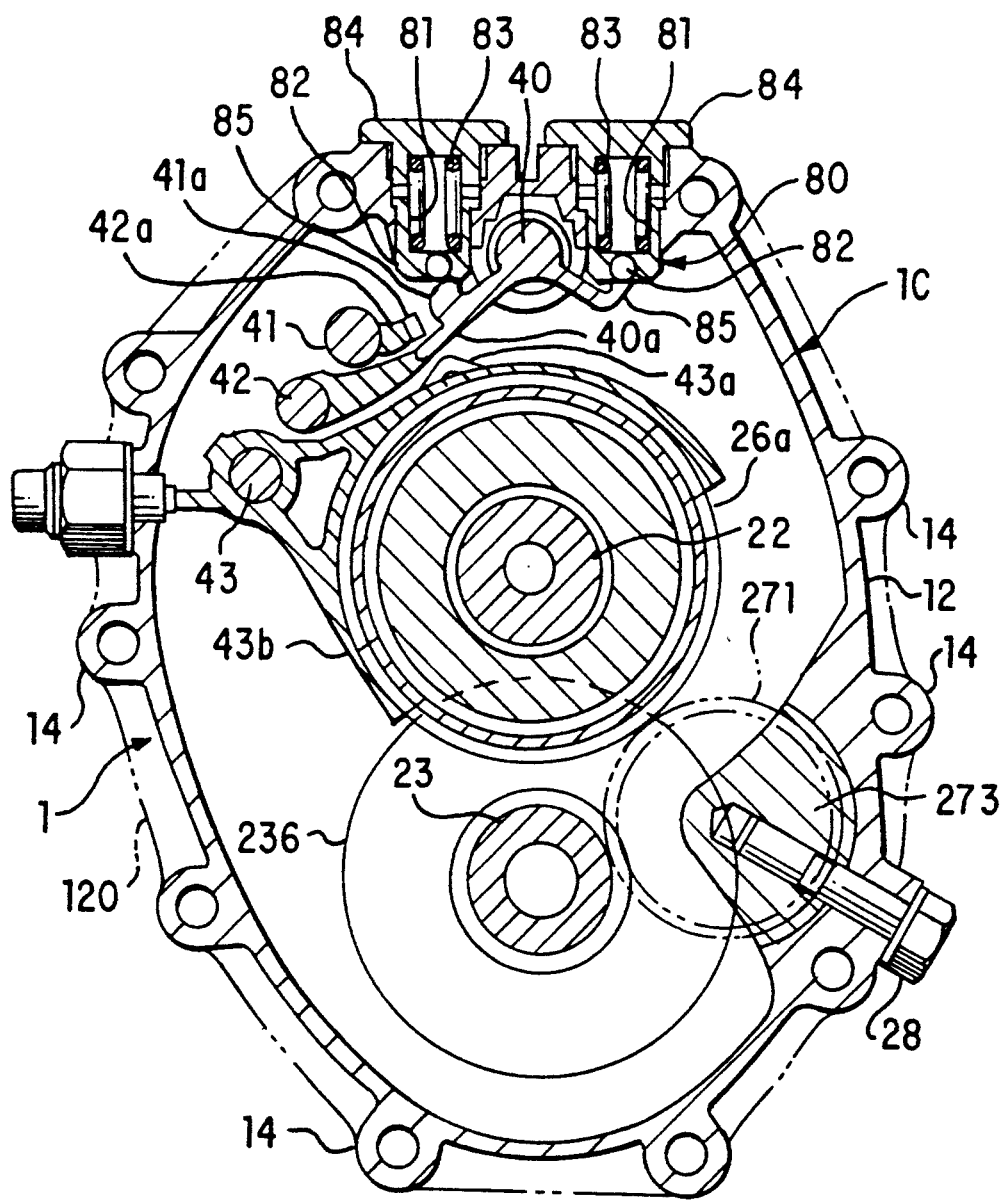
FIG. 3 is a sectional view of the transmission apparatus of FIG. 1 along line III—III.

Show FIGS. 3 to 9, a shift mechanism, including a control rod 40 and first to third shift rods 41-43, as installed so as to extend axially in the upper portion of the transmission casing 1. The shift mechanism further includes a detent mechanism 50, an inter-lock mechanism 60, a mis-reversal shift provension mechanism 70 and a select-return mechanism 80, all of which are installed together within the cylindrical transitional portion, 1C of the front part casing 11. The control rod 40 is installed in the top wall of the cylindrical transitional portion 1C of the front part casing 11 so as to be parallel to the main shaft 22 and extend, at its rear end portion outside the transmission casing 1 (see FIG. 1). As is clearly seen in FIGS. 6 and 7, the control rod 40 is coupled to a lower end of a gear change lever 402 through a link 401 so as to turn and slide according to gear select and shift operations of the gear change lever 402. The gear change lever 402 is supported by a holding mount 403. In order to prevent undesired motion of the gear change lever 402, there is provided a coupling member 404 disposed on each side of the link 401 so as to restrict the movement of the gear change lever 402 relative to the holding mount 403. The coupling member 404 is connected, at its one end, to the holding mount 403 and, at its other end, to a generally U-shaped bracket 405 fixed to the transmission casing 1 through a pivot 406 and a rubber bush 407. The bracket 405 is secured to the transmission casing 1 by the bolts 13 fastening the front and rear part casing 11 and 12 to each other. As seen in FIG. 3, the control rod 40 is provided with an arm 40a selectively positioned within the cylindrical transitional portion 1C of the front part casing 11. The shift rods 41-43 are, respectively, formed with grooves 41a-43a. According to turned positions of the control rod 40, the control rod 40 brings the arm 40a into engagement with the grooves 41a-43a of the shift rod 41-43. As is clearly shown in FIGS. 3, 8 and 9, each shift rod 41, 42 or 43 is provided with a shift fork 41b, 42b or 43b engageable with the annular slidable sleeve 24a, 25a or 26a of the synchronizing mechanism 24, 25 or 26. respectively.

Figure 8:
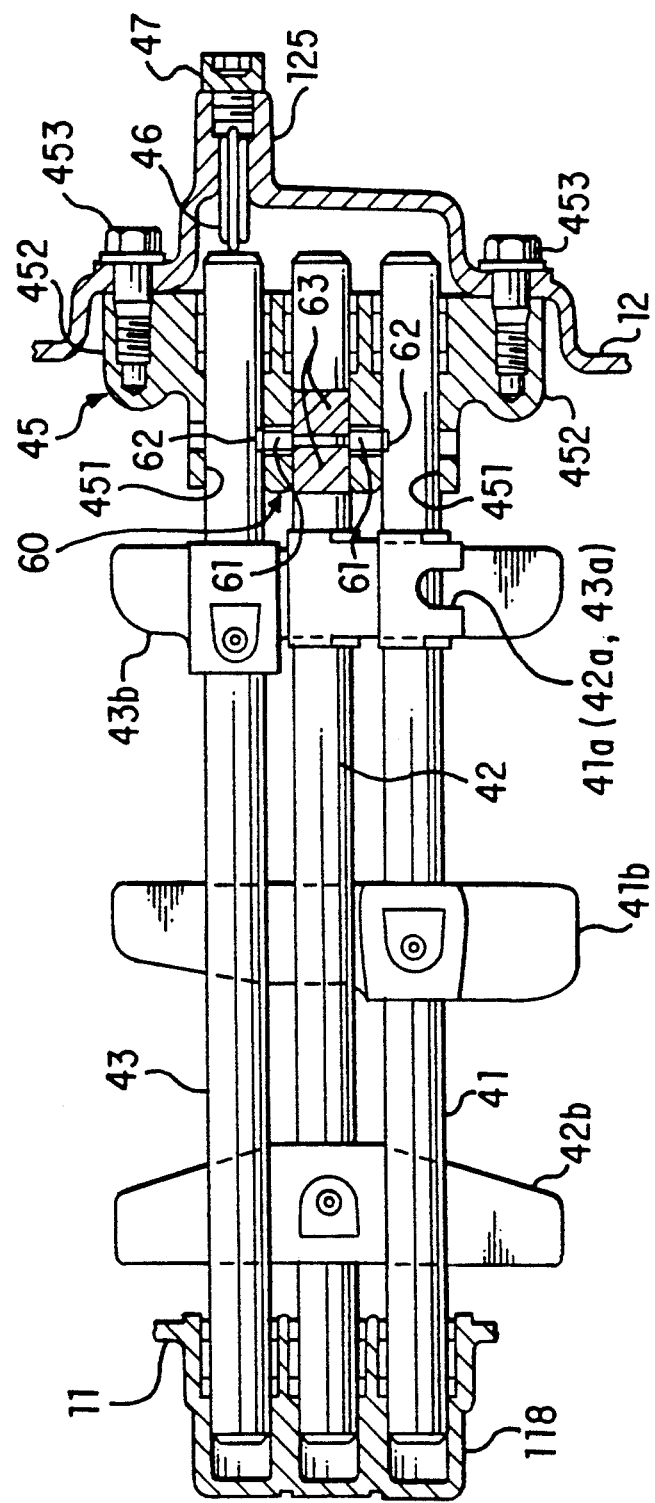
FIG. 8 is a cross-sectional view of a part of the transmission as viewed from the top where the shift rod is disposed.
Figure 9:
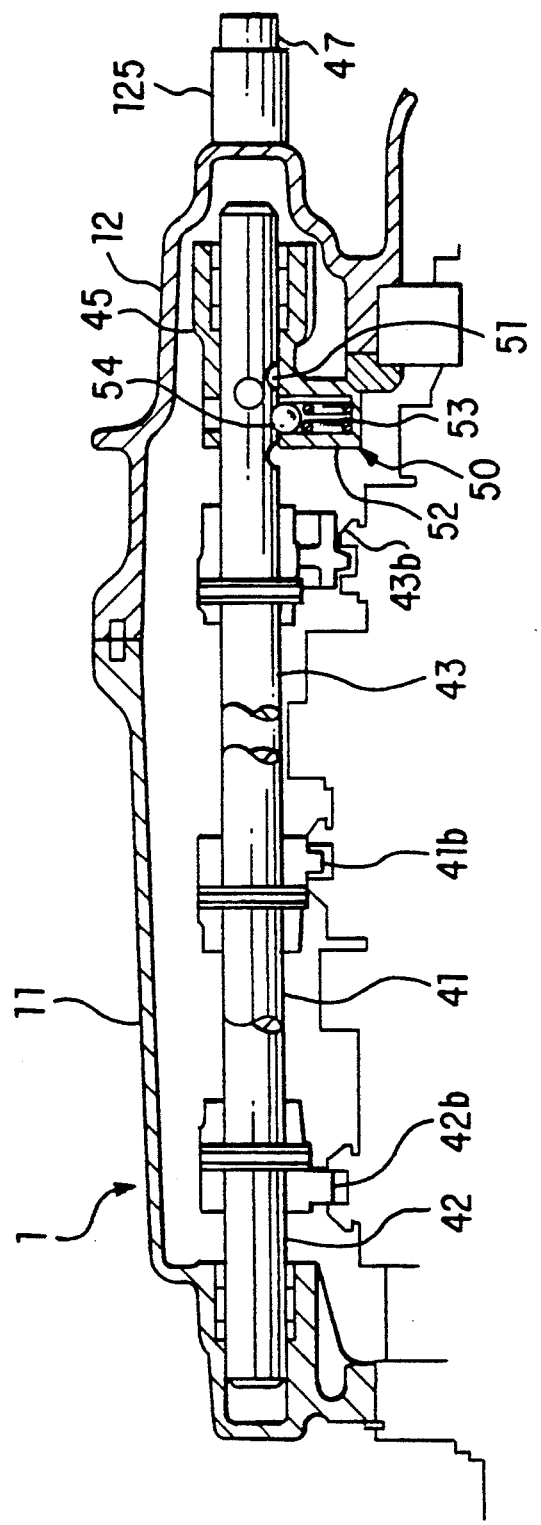
FIG. 9 is a cross-sectional view of a part of the transmission as viewed from the side where the shift rod is disposed.

As shown in FIGS. 8 and 9, the shift rods 41-43, placed in parallel with one another, are supported for sliding movement at their rear ends by a sub-frame 45 disposed within the rear part casing 12 and at their front ends by a support mount integrally formed with the front part casing 11. The sub-frame 45 has a guide mount 451 for guiding independently the shift rods 41-43. The guide mount 451 is formed with a bolt boss 452 at each lateral side for a fastening bolt 453 for securing the guide mount 451 to the rear part casing 12. At least one of the shift rods 41-43 is provided with a spring 46 for preventing the gears from producing noise between teeth. For example, in this embodiment, the spring 45 is attached to the shift rod 43, which is used for over-drive and reverse operations, and exerts a friction force on the reverse gear 224 of the main shaft 22 so as to force the shift rod 43 forward. This prevents the reverse gear 224 from producing noise. The spring 46 is received in a bore 125 formed in the rear part casing 12 and is adjusted in pressure by a screw plug 47.

Referring to FIG. 9, the detent mechanism 50, which provides click stop feeling when the shift rod 43 is slid by the gear change lever 40, is disposed between the sub-frame 45 and a set of the shift rods 41-43. Each shift rod 41, 42 or 43 is formed with a plurality of detents 51. The sub-frame 45 is provided with a ball mount 52 formed with a bore for each shift rod. A ball 54 is received in the ball mount 52 and forced against the corresponding shift rod. The ball 54 is forced down by the shift rod, and the shift rod an is allowed to slide in the axial direction and stopped when the ball 54 is seated on the next detent 51. In such a way, the gear change lever 402 is operated with a click stop feeling.

The inter-lock mechanism 60, which is provided in order to prevent two or three shift rods from being simultaneously operated, is disposed between the sub-frame 45 and the first to third shift rods 41-43. As shown in FIG. 8, the sub-frame 45 is provided with lock pins 61 which are supported by partition walls of the guide mount 451, respectively, so as to be movable in a direction perpendicular to the axes of the shift rods 41-43. The first to third shift rods 41-43 are formed with detents 62 corresponding in position to the lock pins 61. The second shift rod 42, located between the first and third shift rods 41 and 43, is provided with a pin 63 extending diametrically between the detents 62. When all of the shift rods 41-43 are in their neutral positions, the lock pins 61 are aligned with the respective detents 62 of the first to third shift rods 41-43. When any one of the first to third shift rods 41-43 slides and comes out of the neutral position, the shift rod forces sideways the adjacent lock pin 61 and pushes both the lock pins 61 sideways, so as to bring the lock pins 61 into engagement with the detents 62 of the remaining shift rods. In such a way, when any one of the shift rods 41-43 slides, the remaining shift rods are locked and prevented from being mis-shifted.

Figure 4:
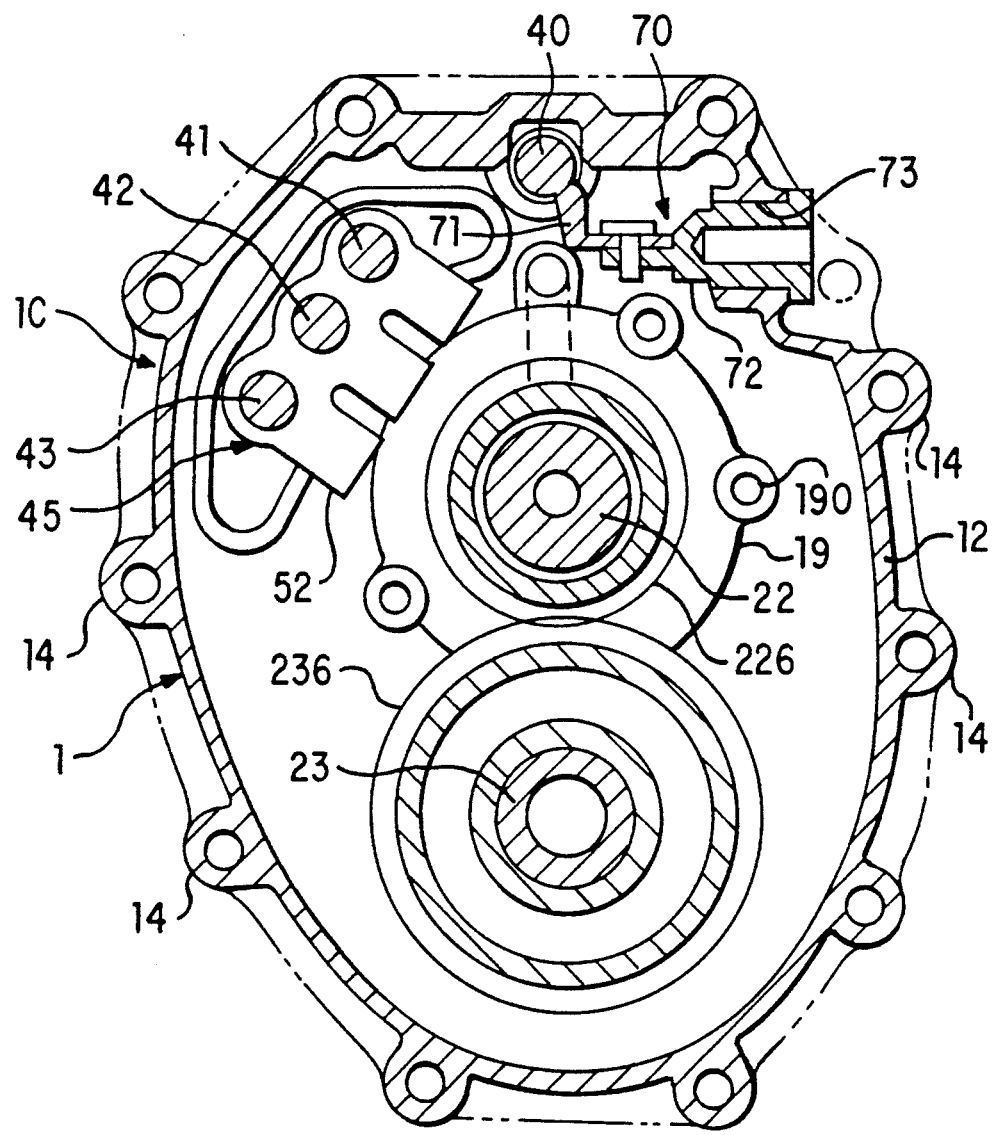
FIG. 4 is a sectional view of the transmission apparatus of FIG. 1 along line IV—IV.
Figure 5:
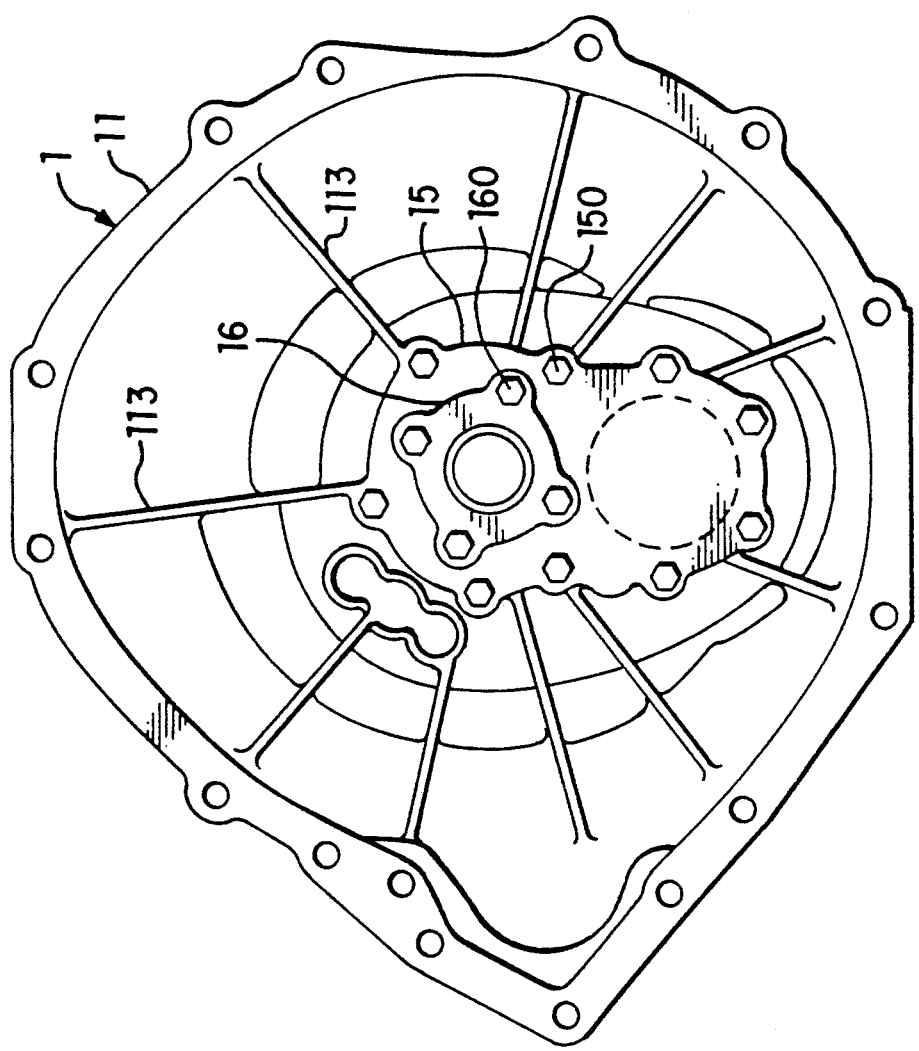
FIG. 5 is a front view of the transmission apparatus of FIG. 1.
Figure 6:
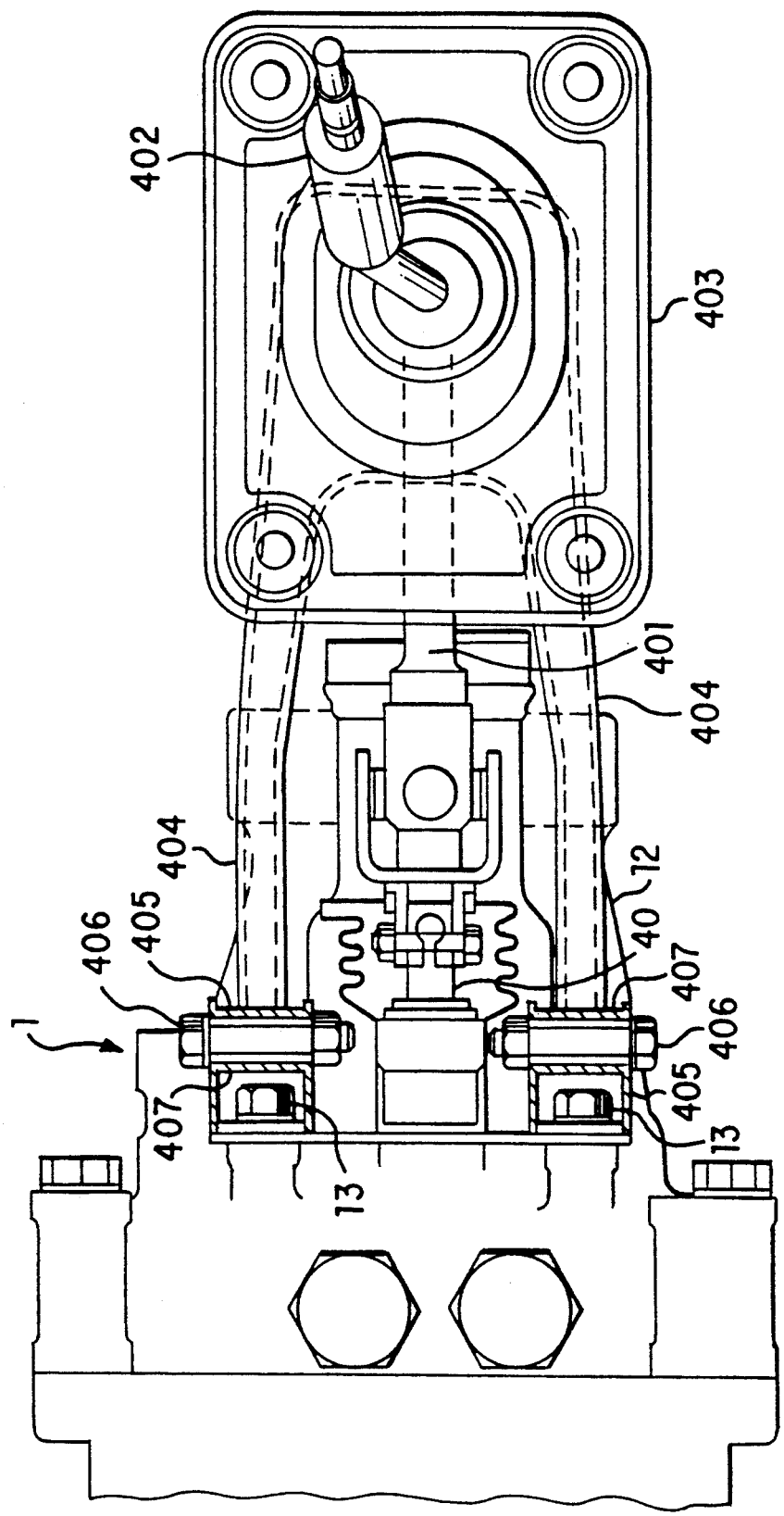
FIG. 6 is a plan view, partly in section, of a part of the transmission apparatus of FIG. 1 in which a control lever is connected to a gear change lever.
Figure 7:
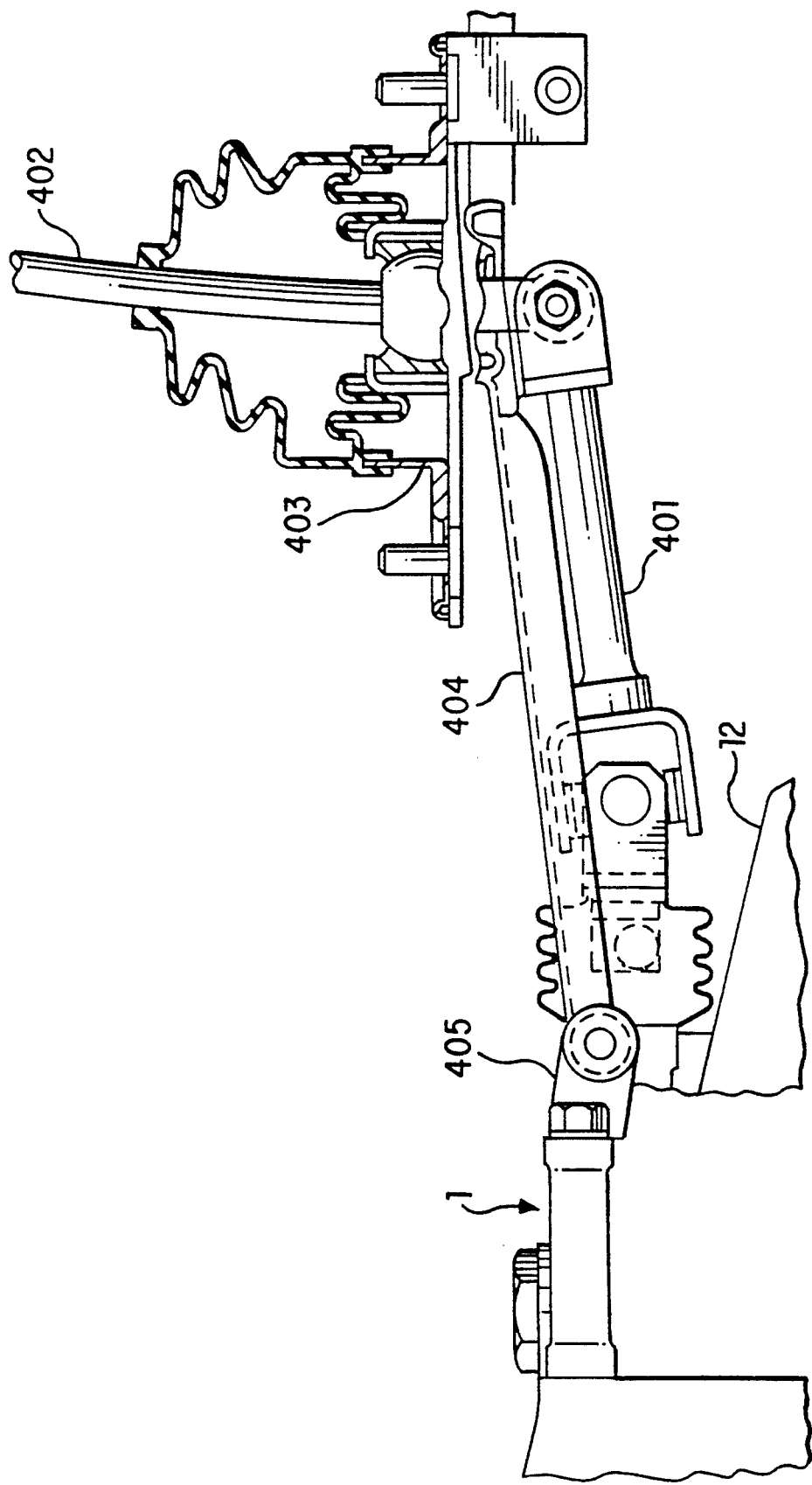
FIG. 7 is a front view, similar to FIG. 6 but partly in section, of the transmission apparatus of FIG. 1.
Figure 10:
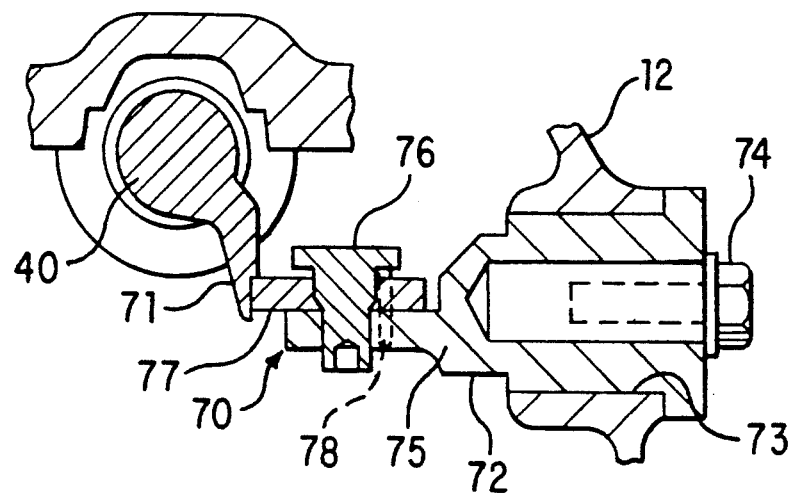
FIG. 10 is an enlarged cross-sectional view of a mis-reverse shift prevention mechanism.
Figure 11:
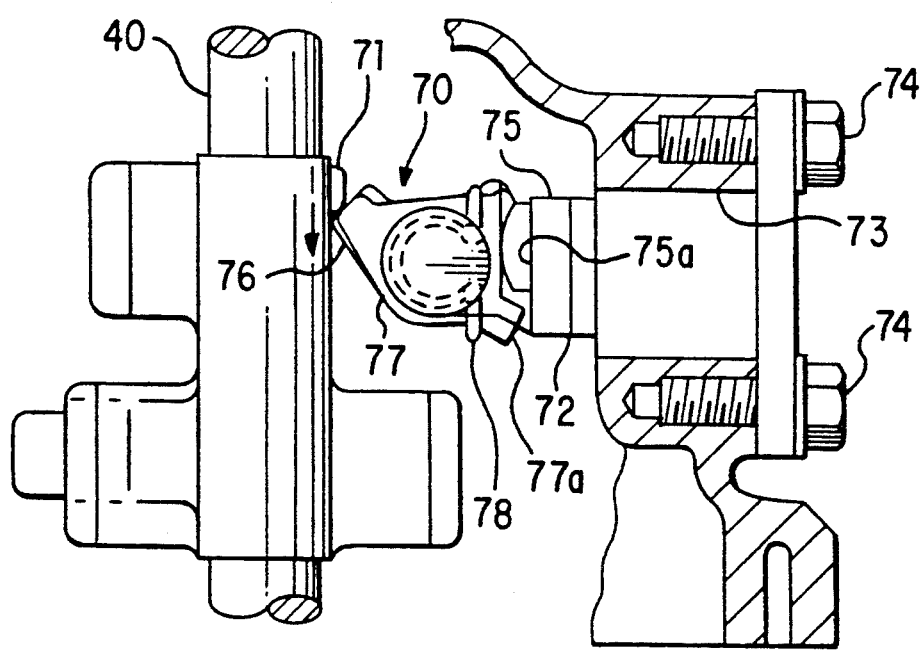
FIG. 11 is an enlarged cross-sectional view of a part of the mis-reverse shift prevention mechanism of FIG. 10.
Figure 12:
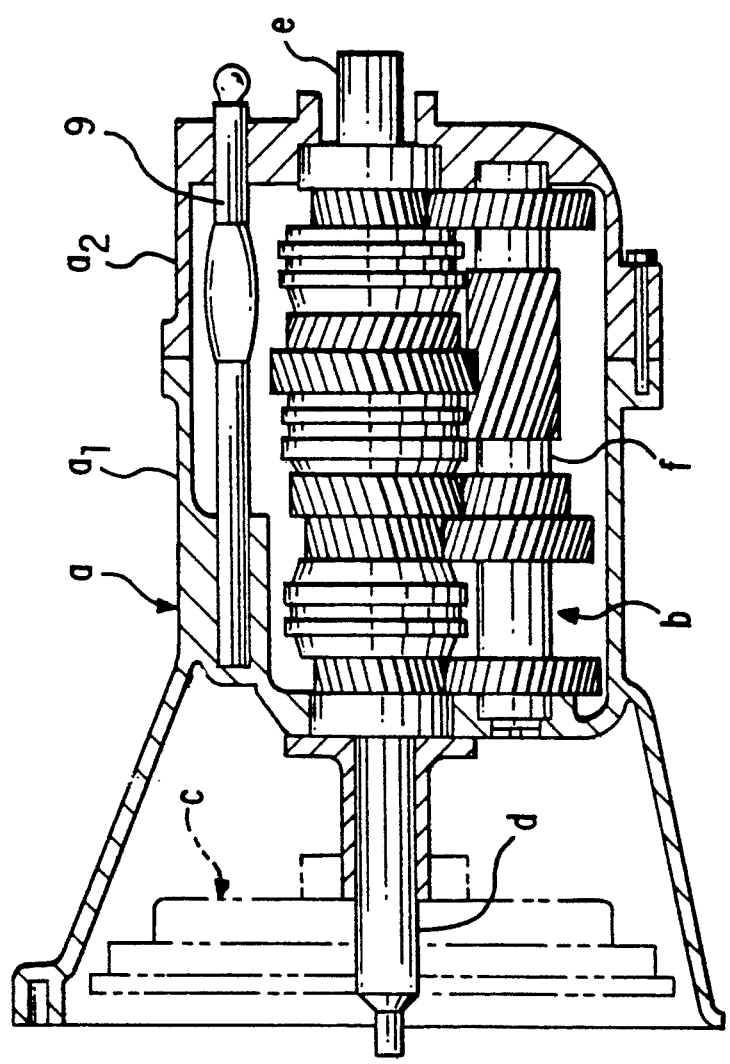
FIG. 12 is a schematic cross-sectional view of a prior art transmission.

Referring to FIGS. 10 and 11 in connection with FIG. 4, the mis-reversal shift prevension mechanism 70, which prevents an operation of the gear shift lever 402 from an over-drive position to a reverse position, has a one unit 72 of essential elements assembled to the rear part casing 12. The unit 72 is fitted in an opening 73, formed in an upper portion of the rear part casing 12, from the back and secured to the rear part casing 12 by a bolt 74. The unit 72 includes a base block 75, a mis-shift prevention cam 77 mounted for rotation on a pivot 76, and a retention spring 78 for urging the mis-shift prevention cam 77 toward an original position. When it is intended to change the gear change lever 402 from the over-drive position to the reverse position and force the control rod 40 to slide, an arm 71, extending from the control rod 40, pushes and turns the mis-shift prevention cam 77. When the mis-shift prevention cam 77 is turned to some extent, a stopper projection 77a of the mis-shift prevention cam 77 is brought into engagement with a step shoulder 75a of the base block 75 so as to prevent the control rod 40 from further sliding. In such a way, a mis-operation of the gear change lever 402 from the over-drive position to the reverse position is prevented.

The select return mechanism 80, which is disposed between the control rod 40 and the top of the rear part casing 12, forces the control rod 40 to a middle position between the limits of turn of the control rod 40 when the transmission is neutral. As shown in FIG. 3, on opposite sides of the control rod 40, there are disposed return pistons 82 received, respectively, in cylinder bores 81 formed integral with the rear part casing 12. A plug 84 is screwed into an upper end portion of the cylinder bores 81. Each piston 82 is forced downward by a coil spring 83 received in the cylinder bore 81 and is engaged at its lower end, by an arm 85 integrally formed with and extending from the control rod 40. When the gear change lever 402 is operated, for instance, to a first/second speed gear select position, the control rod 40 is turned in the clockwise direction and forces upward one of the return pistons 82 (the left side return piston as viewed in FIG. 3) with the arm 85. As a result, the coil spring 83 is compressed and reacts to exert force on the arm 85 so as to return the control lever 40. Similarly, when the gear change lever 402 is operated to an over-drive/return gear select position, the control rod 40 is turned in the counter-clockwise direction and forces upward the other of the return pistons 82 (the right side return piston as viewed in FIG. 3) with the arm 85. As a result, the coil spring 83 is compressed and reacts to exert force on the arm 85 so as to return the control lever 40. When the gear change lever 402 is freed from an external force at the neutral position, the control rod 40 is returned by the return piston to the neutral position shown in FIG. 3.

As is apparent from the above description, the transmission casing 1 is generally shaped as a frustum of a cone excepting the cylindrical transitional portion 1C, so as to have a high structural stiffness. As a result, the transmission casing 1 suffers from less vibration during engine operation. The front part casing 11 has a partly double walled structure which is provided by the clutch housing 111 and the transmission housing 112 and reinforced by the rib 113 between the clutch housing 111 and the transmission housing 112. The double walled structure is effective to cut noise from the transmission 2. Since where the clutch housing 111 and the transmission housing 112 are connected is the middle portion of the transmission casing 1 in the axial direction, the transmission casing 1, the middle portion of which is subjected to a great stress, is reinforced in structural stiffness. In addition, since the transitional portion 1C of the transmission casing 1, including a connected portion between the clutch housing 111 and the transmission housing 112, is cylindrically shaped, it is certain and easy to provide the bosses 14 for the bolts 13 for securing the clutch housing 111 and the transmission housing 112 around the transitional portion 1C.

Although the present invention has been fully described by way of the preferred embodiment thereof with reference to the accompanying drawings, it is to be noted that various changes and modifications are apparent to those skilled in the art. Therefore, unless such changes and modifications depart from the scope of the present invention, they are intended to be covered by the following claims.

What is claimed is:

1. A transmission apparatus having a transmission casing and a transmission housed in the transmission casing, said transmission including a clutch, various speed gears, a shaft for supporting said various speed gears, front and rear bearings spatially provided in an axial direction of said shaft for rotatably supporting said shaft relative to said transmission casing, and speed gear shift means, having a control rod and a gear change lever, for changing gear speeds, said transmission casing comprising:

a front part casing shaped generally as a frustum of a cone for forming a front part of said transmission casing;

a rear part casing shaped generally as a frustum of a cone for forming a rear part of said transmission casing, said rear part casing being connected to said front part casing so as to form said transmission casing so that it has a cross section gradually decreasing from its front to its back;

wherein a generally cylindrical transitional portion is formed by a rear end portion of said front part casing and a front end portion of said rear part casing, said generally cylindrical transitional portion being displaced behind the front bearing and in front of the rear bearing in the axial direction of said shaft.

2. A transmission apparatus as defined in claim 1, wherein said front part casing forms therein a clutch housing for housing said clutch and a transmission housing partly extending in said clutch housing for housing a part of said transmission means.

3. A transmission apparatus as defined in claim 2, further comprising a rib radially extending between said clutch housing and a part of said transmission housing partly extending in said clutch housing.

4. A transmission apparatus as defined in claim 2, wherein said clutch housing extends to a middle portion of said transmission casing.

5. A transmission apparatus as defined in claim 1, and further comprising a slidable yoke, disposed in a rear end portion of said rear part casing, for connecting said transmission to a propeller shaft.

6. A transmission apparatus as defined in claim 1, wherein said control rod is disposed in a generally cylindrical transitional portion of said transmission casing and extends partly out of said rear part casing.

7. A transmission apparatus as defined in claim 6, and further comprising holding means for holding said gear change lever and bracket means for connecting said holding means to said transmission casing, said bracket means being secured to said transmission casing by bolts connecting said rear part casing to said front part casing.

8. A transmission apparatus having a transmission casing and a transmission housed in the transmission casing, said transmission including a clutch, various speed gears, speed gear shift means, having a control rod and a gear change lever, for changing gear speeds, said transmission casing comprising:

a front part casing shaped generally as a frustum of a cone for forming a front part of said transmission casing; and a rear part casing shaped generally as a frustum of a cone for forming a rear part of said transmission casing, said rear part casing being connected to said front part casing so as to form said transmission casing so that it has a cross section gradually decreasing from the front to the back of said transmission casing, wherein said front part casing forms therein a clutch housing for housing said clutch and a transmission housing partly extending in said clutch housing for housing a part of said transmission and said rear part casing is provided with an oil path formed in an inclined wall thereof.

9. A transmission apparatus having a transmission casing and a transmission housed in the transmission casing, said transmission including a clutch, various speed gears, speed gear shift means, having a control rod and a gear change lever, for changing gear speeds, said transmission casing comprising:
- a front part casing shaped generally as a frustum of a cone for forming a front part of said transmission casing;
- a rear part casing shaped generally as a frustum of a cone for forming a rear part of said transmission casing, said rear part casing being connected to said front part casing so as to form said transmission casing so that it has a cross section gradually decreasing from the front to the back of said transmission casing; and
- a slidable yoke, disposed in a rear end portion of said rear part casing, for connecting said transmission to a propeller shaft wherein said rear part casing is provided with an oil path, formed in an inclined wall thereof, for supplying lubrication oil to said yoke.

10. A transmission apparatus having a transmission casing and a transmission housed in the transmission casing, said transmission including a clutch, various speed gears, speed gear shift means, having a control rod and a gear change lever, for changing gear speeds, said transmission casing comprising:
- a front part casing shaped generally as a frustum of a cone for forming a front part of said transmission casing; and
- a rear part casing shaped generally as a frustum of a cone for forming a rear part of said transmission casing, said rear part casing being connected to said front part casing so as to form said transmission casing so that it has a cross section gradually decreasing from the front to the back of said transmission casing, wherein said rear part casing is provided with an oil path formed in an inclined wall thereof.

* * * * *